(12) United States Patent
Tsukasaki et al.

(10) Patent No.: US 12,043,329 B2
(45) Date of Patent: Jul. 23, 2024

(54) AUTOMATIC STEERING CONTROL DEVICE

(71) Applicant: SUBARU CORPORATION, Tokyo (JP)

(72) Inventors: Yuichiro Tsukasaki, Tokyo (JP); Yasushi Takaso, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 404 days.

(21) Appl. No.: 17/212,517

(22) Filed: Mar. 25, 2021

(65) Prior Publication Data

US 2021/0309288 A1   Oct. 7, 2021

(30) Foreign Application Priority Data

Apr. 6, 2020   (JP) .................................. 2020-068348

(51) Int. Cl.
  B62D 6/00    (2006.01)
  B62D 5/04    (2006.01)
(52) U.S. Cl.
  CPC ........... B62D 6/002 (2013.01); B62D 5/0409 (2013.01); B62D 5/0463 (2013.01)
(58) Field of Classification Search
  None
  See application file for complete search history.

(56) References Cited

U.S. PATENT DOCUMENTS

| 5,245,422 A * | 9/1993 | Borcherts | ............ | G05D 1/0246 701/28 |
| 6,061,610 A * | 5/2000 | Boer | ...................... | G08B 21/06 340/576 |

(Continued)

FOREIGN PATENT DOCUMENTS

| EP | 1464938 A2 * | 10/2004 | ............... B62D 6/10 |
| JP | 2006-056372 A | 3/2006 | |

(Continued)

OTHER PUBLICATIONS

Office Action issued in corresponding Japanese Patent Application No. 2020-068348, dated Aug. 15, 2023, w/English Translation.

*Primary Examiner* — Christian Chace
*Assistant Examiner* — Scott R Jagolinzer
(74) *Attorney, Agent, or Firm* — Rimon P.C.

(57) ABSTRACT

An automatic steering control apparatus includes a road information recognition device, a travel state detector, and a steering angle control device. The road information recognition device recognizes road information ahead of a vehicle. The travel state detector detects information regarding a travel state of the vehicle. The steering angle control device controls a steering angle of the vehicle, on the basis of the road information and the information regarding the travel state, to allow the vehicle to move toward a target position ahead of the vehicle. The steering angle control device controls the steering angle, to allow at least a portion of a steering angle waveform to have a non-sinusoidal wave. The steering angle waveform represents a time change in the steering angle in a case where the vehicle travels while crossing repetitively an ideal travel locus to be obtained from the target position.

3 Claims, 7 Drawing Sheets

(56) References Cited

U.S. PATENT DOCUMENTS

| | | | |
|---|---|---|---|
| 2005/0065697 A1* | 3/2005 | Niino | B62D 7/159 |
| | | | 180/408 |
| 2006/0041356 A1 | 2/2006 | Shirato et al. | |
| 2009/0157260 A1* | 6/2009 | Lee | B62D 15/0285 |
| | | | 701/41 |
| 2009/0182505 A1* | 7/2009 | Ikeda | G01S 13/931 |
| | | | 701/301 |
| 2009/0228182 A1* | 9/2009 | Waldbauer | B62D 13/00 |
| | | | 701/70 |
| 2013/0190982 A1* | 7/2013 | Nakano | B62D 15/025 |
| | | | 701/41 |
| 2015/0039186 A1* | 2/2015 | Okuda | B60W 50/14 |
| | | | 701/41 |
| 2017/0088169 A1 | 3/2017 | Kubo | |
| 2017/0088174 A1* | 3/2017 | Inoue | B62D 6/003 |
| 2017/0225686 A1 | 8/2017 | Takaso et al. | |
| 2019/0041218 A1* | 2/2019 | Hirata | G01C 21/14 |
| 2020/0050196 A1* | 2/2020 | Liao-McPherson | |
| | | | G05B 13/048 |
| 2021/0171051 A1* | 6/2021 | Takeda | B60W 50/082 |

FOREIGN PATENT DOCUMENTS

| | | |
|---|---|---|
| JP | 2014-101100 A | 6/2014 |
| JP | 2015-058903 A | 3/2015 |
| JP | 2017-061279 A | 3/2017 |
| JP | 2017-061281 A | 3/2017 |
| JP | 2017-137001 A | 8/2017 |

* cited by examiner

AUTOMATIC STEERING CONTROL DEVICE

CROSS-REFERENCE TO RELATED APPLICATIONS

This application claims priority from Japanese Patent Application No. 2020-068348 filed on Apr. 6, 2020, the entire contents of which are hereby incorporated by reference.

BACKGROUND

The disclosure relates to an automatic steering control apparatus that makes an automatic steering control including allowing a vehicle to travel along a target course.

Recently, automated driving control apparatuses and driver assistance apparatuses for vehicles have been developed and put into practical use. Such apparatuses utilize automated driving techniques. A known example of such apparatuses is an automatic steering control apparatus. An automatic steering control apparatus controls a steering angle of a vehicle, to execute an automatic steering control. The automatic steering control includes allowing the vehicle to travel along a target course. In the automatic steering control, a target position of the vehicle is set on the basis of a result of lane recognition by, for example, a camera mounted on the vehicle. The steering angle of the vehicle is controlled to allow the vehicle to travel along a locus of the target position.

The steering angle of the vehicle is controlled with the use of an electric power steering device. While the automatic steering control is not being executed, the electric power steering device controls a drive current to be fed to an electric power steering motor, in accordance with, for example, magnitude of steering torque. Thus, the electric power steering device generates assistance torque that assists a driver with an operation of a steering wheel.

In the automatic steering control as well, the electric power steering device is controlled by target torque generated on the basis of a target steering angle. The electric power steering device controls the steering angle of the vehicle on the basis of the target torque.

The automatic steering control apparatus sets the target position of the vehicle, for example, on a centerline of a lane, to execute a lane keeping control. The lane keeping control includes allowing an own vehicle to travel along the lane. Such an automatic steering control apparatus is disclosed in, for example, Japanese Unexamined Patent Application Publication (JP-A) No. 2015-058903.

SUMMARY

An aspect of the technology provides an automatic steering control apparatus configured to make an automatic steering control including allowing a vehicle to travel along a target course. The automatic steering control apparatus includes a road information recognition device, a travel state detector, and a steering angle control device. The road information recognition device is configured to recognize road information ahead of the vehicle. The travel state detector is configured to detect information regarding a travel state of the vehicle. The steering angle control device is configured to control a steering angle of the vehicle, on the basis of the road information and the information regarding the travel state, to allow the vehicle to move toward a target position ahead of the vehicle. The steering angle control device is configured to control the steering angle, to allow at least a portion of a steering angle waveform to have a non-sinusoidal wave. The steering angle waveform is a waveform representing a time change in the steering angle in a case where the vehicle travels while crossing repetitively an ideal travel locus to be obtained from the target position.

An aspect of the technology provides an automatic steering control apparatus that makes an automatic steering control including allowing a vehicle to travel along a target course. The automatic steering control apparatus includes a road information recognition device, a travel state detector, and circuitry. The road information recognition device is configured to recognize road information ahead of the vehicle. The travel state detector is configured to detect information regarding a travel state of the vehicle. The circuitry is configured to control a steering angle of the vehicle, on the basis of the road information and the information regarding the travel state, to allow the vehicle to move toward a target position ahead of the vehicle. The circuitry is configured to control the steering angle, to allow at least a portion of a steering angle waveform to have a non-sinusoidal wave. The steering angle waveform is a waveform representing a time change in the steering angle in a case where the vehicle travels while crossing repetitively an ideal travel locus to be obtained from the target position.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
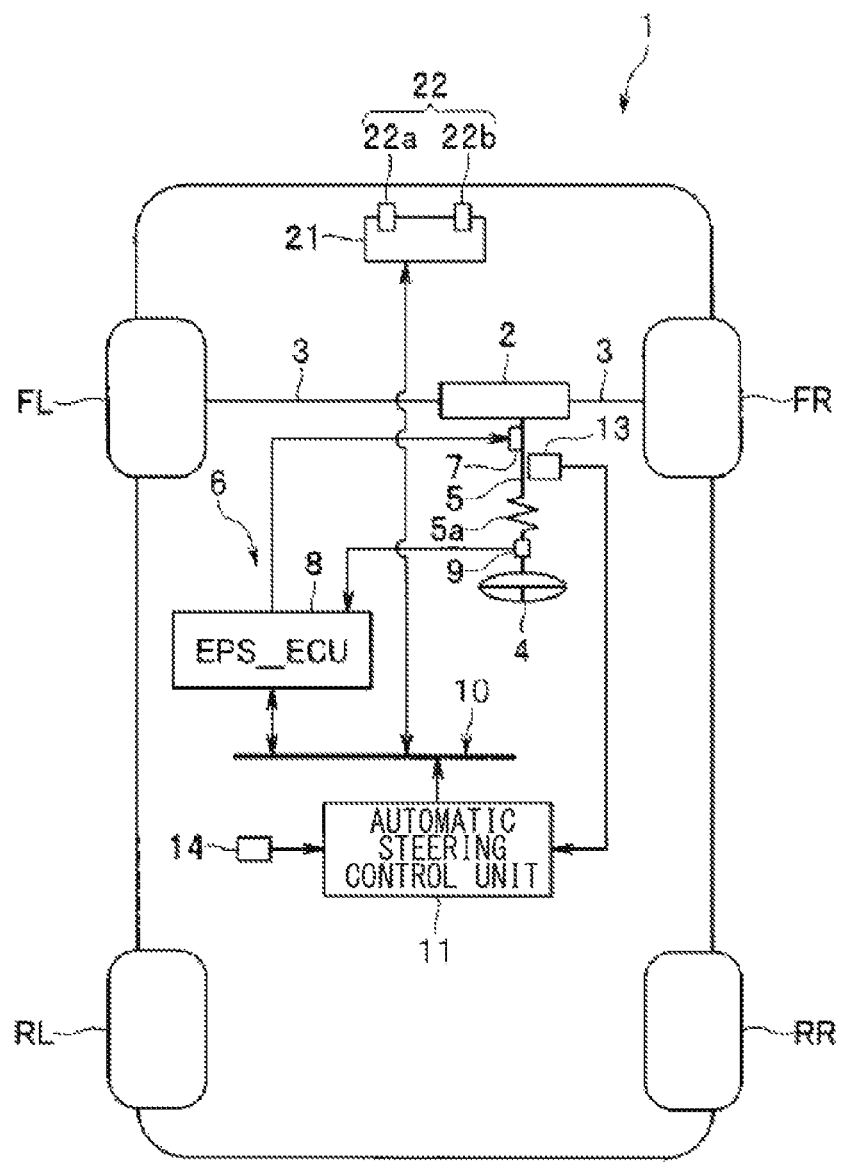
FIG. 1 schematically illustrates an overall configuration of a vehicle on which an automatic steering control apparatus according to a first embodiment of the disclosure is mounted.

In a case with execution of a lane keeping control along a straight road, a steering angle ideally becomes zero (0). In reality, however, a position of a vehicle deviates slightly from a target position because of influences of, for example, external disturbances. Accordingly, a control of correcting the position of the vehicle by changing the steering angle is repeatedly executed. As a result, the vehicle travels while crossing repetitively an ideal travel locus to be obtained from the target position. Thus, the lane keeping control may possibly involve periodic sway of the vehicle around the target position.

Generally, in a state where a vehicle travels while crossing repetitively the ideal travel locus, a steering angle waveform, i.e., a waveform representing a time change in the steering angle, has a waveform like a sine wave. The inventors of the technology have found that a regular steering angle waveform like a sine wave gives the sense of discomfort to an occupant.

The sense of discomfort as mentioned above is not limited to the case with the execution of the lane keeping control along a straight road, but also occurs in a case with the execution of the lane keeping control along a curve.

It is desirable to provide an automatic steering control apparatus that makes it possible to alleviate the sense of discomfort caused by periodic sway of a vehicle on the occasion of execution of an automatic steering control.

First Embodiment

In the following, some embodiments of the disclosure are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

First, with reference to FIG. 1, description is given of an overall configuration of a vehicle on which an automatic steering control apparatus according to a first embodiment of the disclosure is mounted. As illustrated in FIG. 1, a vehicle 1 may include a left front wheel FL, a right front wheel FR, a left rear wheel RL, and a right rear wheel RR. The following description is made by giving an example where the left front wheel FL and the right front wheel FR are configured to serve as driving wheels and steering wheels.

The vehicle 1 may further include a steering mechanism 2 such as a lack and pinion mechanism, without limitation. The steering mechanism 2 may be linked to the left front wheel FL and the right front wheel FR through respective tie rods 3. The steering mechanism 2 may be also linked to a steering shaft 5. To one end of the steering shaft 5, a steering wheel 4 may be fixed. The left front wheel FL and the right front wheel FR may be steered to the left or to the right through the steering mechanism 2, by a driver's operation of the steering wheel 4.

The vehicle 1 may further include an EPS (electric power steering) device 6. The EPS device 6 may include an EPS (electric power steering) motor 7 and an EPS (electric power steering) control unit 8. It is to be noted that in FIG. 1, the EPS control unit is abbreviated to EPS ECU. The EPS motor 7 may be linked to the steering shaft 5 through an undepicted transmission mechanism.

The vehicle 1 may further include a steering torque sensor 9. The steering torque sensor 9 is configured to detect, from a torsion angle of a torsion bar 5a, steering torque to be inputted to the steering wheel 4 by the driver. The torsion bar 5a may be disposed on the steering shaft 5. The steering torque sensor 9 may be coupled to the EPS control unit 8.

The EPS control unit 8 may set assistance torque on the basis of a result of detection by, for example, the steering torque sensor 9 and a vehicle speed sensor described later. The assistance torque is provided for assistance with the steering torque by the driver. Moreover, the EPS control unit 8 may control the EPS motor 7, to allow the assistance torque thus set to be applied to the steering shaft 5.

The vehicle 1 may further include an automatic steering control unit 11. The EPS control unit 8 and the automatic steering control unit 11 may be coupled to an in-vehicle network 10 such as a CAN (Controller Area Network). Although not illustrated, a plurality of electronic control units may be further coupled to the in-vehicle network 10. The plurality of the electronic control units is configured to control a travel state of the vehicle 1. Non-limiting examples may include an engine control unit, a transmission control unit, and a brake control unit.

The automatic steering control unit 11 may serve as a controller of the automatic steering control apparatus. The automatic steering control apparatus makes an automatic steering control. The automatic steering control includes allowing the vehicle 1 to travel along a target course. On the occasion of execution of the automatic steering control, the automatic steering control unit 11 may set target torque on the basis of a target steering angle of the vehicle 1, and transmit, to the EPS control unit 8, a command signal corresponding to the target torque thus set. On the basis of the command signal received, the EPS control unit 8 may control the EPS motor 7, to allow the set target torque to be applied to the steering shaft 5.

The automatic steering control unit 11 may execute the automatic steering control in a case where, for example, the automatic steering control unit 11 detects, for example, an operation by the driver to turn on a switch for the automatic steering control. Moreover, the automatic steering control unit 11 may release the automatic steering control in a case where the automatic steering control unit 11 detects, for example, a predetermined driving operation by the driver and an operation of a release switch for the automatic steering control. Non-limiting examples of the predetermined driving operation by the driver may include an operation of the steering wheel.

To the automatic steering control unit 11, a plurality of sensors may be coupled. Non-limiting examples of the sensors may include a vehicle speed sensor 14 and a steering angle sensor 13. The vehicle speed sensor 14 may detect a vehicle speed of the vehicle 1. The steering angle sensor 13 may detect a steering angle and a steering direction of the vehicle 1. As to the steering angle, the steering torque, the assistance torque, and the target torque of the vehicle 1, whether each of them is positive or whether each of them is negative may be defined by whether the vehicle 1 makes a left turn or whether the vehicle 1 makes a right turn.

Figure 2:
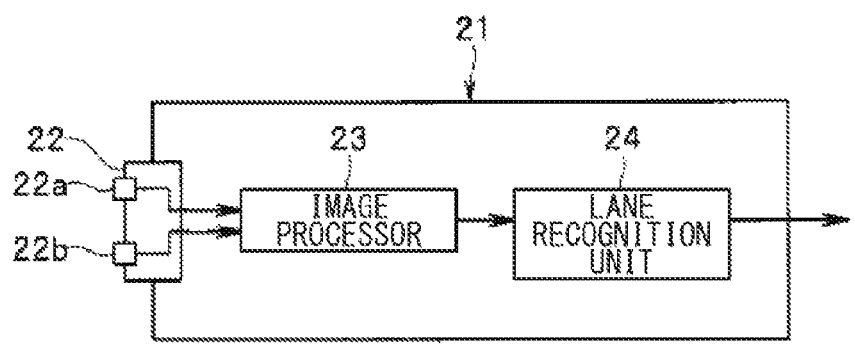
FIG. 2 is a block diagram illustrating a configuration of a camera unit in the first embodiment of the disclosure.

The vehicle 1 may further include a camera unit 21. Referring now to FIGS. 1 and 2, the camera unit 21 is described in detail. FIG. 2 is a block diagram illustrating a configuration of the camera unit 21. The camera unit 21 may include an on-vehicle camera 22, an image processor 23, and a lane recognition unit 24. The on-vehicle camera 22 may include a stereo camera including a main camera 22a and a sub-camera 22b.

The cameras 22a and 22b may be disposed, for example, in the vicinity of a front windshield in the vehicle interior. The cameras 22a and 22b may each be disposed at a predetermined distance from a midpoint in a vehicle widthwise direction. The cameras 22a, 22b may each include an imaging element such as a CCD (charge coupled device) or a CMOS (complementary metal oxide semiconductor). The imaging element may capture an image of travel environment forward in a traveling direction in which the vehicle 1 is traveling.

The image processor 23 may convert a pair of analog images captured by the cameras 22a and 22b into digital images of predetermined luminance gradation. Moreover, the image processor 23 may generate reference image data on the basis of an image captured by the main camera 22a, and generate comparative image data on the basis of an image captured by the sub-camera 22b. Thus, the image processor 23 may calculate distance data on the basis of a difference between the reference image data and the comparative image data. The distance data may include a distance from the vehicle 1 to an object.

The lane recognition unit 24 may recognize lane lines drawn on the left and right sides of a lane on which the vehicle 1 is traveling. On the basis of a result of the recognition of the lane lines, the lane recognition unit 24 may calculate a vehicle lateral position, a target lateral position, a curvature of the lane on which the vehicle 1 is traveling (hereinafter, referred to as a lane curvature), and a yaw angle of the vehicle 1 with respect to the lane (hereinafter, referred to as a relative-to-lane yaw angle). The vehicle lateral position is a position of the vehicle 1 in the vehicle widthwise direction. The target lateral position is, for example, on a centerline of the lane defined from the left and right lane lines.

The lane recognition unit 24 may calculate the lane curvature, for example, as follows. First, a virtual road plane is generated on the basis of the reference image data and the comparative image data. Thereafter, on the basis of the distance data, inner edges of the left and right lane lines are plotted on the generated virtual road plane. Thereafter, curvatures of the left and right inner edges are calculated. Thereafter, the lane curvature is calculated on the basis of the curvatures of the left and right inner edges.

The EPS control unit 8, the automatic steering control unit 11, and the camera unit 21 may each include mainly, for example, a microcomputer including a CPU (central processing unit), a ROM (read only memory), and a RAM (random access memory), without limitation. The ROM may hold control programs that realize the operation set for each system. The functions of the EPS control unit 8, the automatic steering control unit 11, and the camera unit 21 are realized by the CPU reading the control programs from the ROM and executing the control programs.

Figure 3:
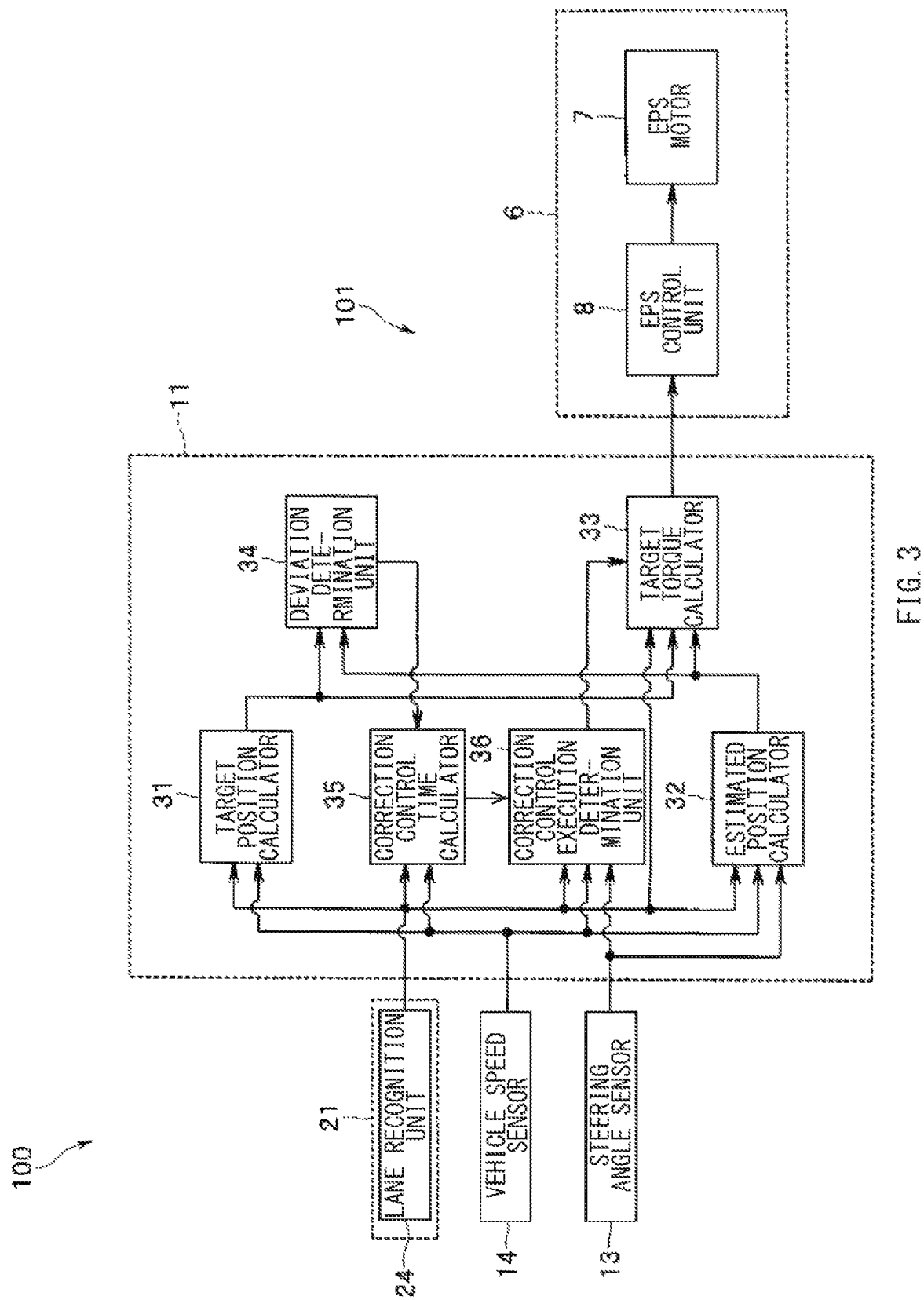
FIG. 3 is a block diagram illustrating a configuration of a main portion of the automatic steering control apparatus according to the first embodiment of the disclosure.

Description is given next, with reference to FIG. 3, of a configuration of an automatic steering control apparatus 100 according to this embodiment. FIG. 3 is a block diagram illustrating a configuration of a main portion of the automatic steering control apparatus 100. The automatic steering control apparatus 100 may include a road information recognition device and a travel state detector. The road information recognition device is configured to recognize road information ahead of the vehicle 1. The road information recognition device may include the camera unit 21. The travel state detector is configured to detect information regarding the travel state of the vehicle 1. The travel state detector may include the camera unit 21 and the plurality of the sensors such as the vehicle speed sensor 14 and the steering angle sensor 13.

The automatic steering control apparatus 100 may further include a steering angle control device 101. The steering angle control device 101 is configured to control the steering angle of the vehicle 1, on the basis of the road information and the information regarding the travel state, to allow the vehicle 1 to move toward a target position ahead of the vehicle 1. The steering angle control device 101 may include a rotation drive unit and a steering angle controller. The rotation drive unit is configured to rotate the steering shaft 5 of the vehicle 1 to steer the vehicle 1. The rotation drive unit may include the EPS device 6. The steering angle controller is configured to transmit, to the rotation drive unit, i.e., the EPS device 6, a command signal having corresponding relation to the steering angle, to cause the execution of the automatic steering control. The steering angle controller may include the automatic steering control unit 11.

The automatic steering control unit 11 may include a target position calculator 31, an estimated position calculator 32, and a target torque calculator 33. The target position calculator 31 is configured to calculate, on the basis of at least the road information, the target position at a predetermined position ahead of and away from the vehicle 1 by a predetermined distance, i.e., a forward gaze distance. In one example, the target position calculator 31 may calculate the target position on the basis of, for example, the target lateral position calculated by the lane recognition unit 24 and the vehicle speed detected by the vehicle speed sensor 14.

The estimated position calculator 32 is configured to calculate, on the basis of at least the information regarding the travel state, an estimated position at the predetermined position ahead of and away from the vehicle 1 by the predetermined distance, i.e., the forward gaze distance. In one example, the estimated position calculator 32 may calculate the estimated position with the use of, for example, the vehicle lateral position and the relative-to-lane yaw angle calculated by the lane recognition unit 24, the steering angle detected by the steering angle sensor 13, and the vehicle speed detected by vehicle speed sensor 14.

The target torque calculator 33 is configured to calculate the target steering angle of the vehicle 1, to decrease an absolute value of a deviation between the target position and the estimated position. Here, an example of a method of calculating the target steering angle is described. First, the target torque calculator 33 may acquire the lane curvature from the lane recognition unit 24, and calculate a first initial target steering angle that allows the vehicle 1 to travel along the lane curvature. Thereafter, the target torque calculator 33 may acquire the relative-to-lane yaw angle from the lane recognition unit 24, and calculate a second initial target steering angle that brings the relative-to-lane yaw angle to a predetermined target yaw angle. Thereafter, the target torque calculator 33 may acquire the target position and the estimated position from the target position calculator 31 and the estimated position calculator 32, and calculate a lateral positional deviation. The lateral positional deviation is a deviation in the vehicle widthwise direction of the vehicle 1 from the target position to the estimated position. Moreover, the target torque calculator 33 may also calculate a third initial target steering angle that brings the lateral positional deviation to zero (0). Thereafter, the target torque calculator 33 may calculate, as the target steering angle, a sum of the first to third initial target steering angles.

Furthermore, the target torque calculator 33 may calculate the target torque. The target torque is torque that steers the vehicle 1 in the automatic steering control, and is torque to be applied to the steering shaft 5 to bring the steering angle to the target steering angle. The target torque calculator 33 may transmit, to the EPS control unit 8 of the EPS device 6, the command signal having the corresponding relation to the target torque.

The EPS control unit 8 may receive the command signal corresponding to the target torque. On the basis of the received command signal, the EPS control unit 8 may control the EPS motor 7, to allow the target torque to be applied to the steering shaft 5. As a result, the steering angle of the vehicle 1 is controlled. It is to be noted that the command signal to be received by the EPS control unit 8 may be any signal that causes consequent application of the target torque to the steering shaft 5. For example, the command signal may be a signal that controls the steering angle.

Figure 4:
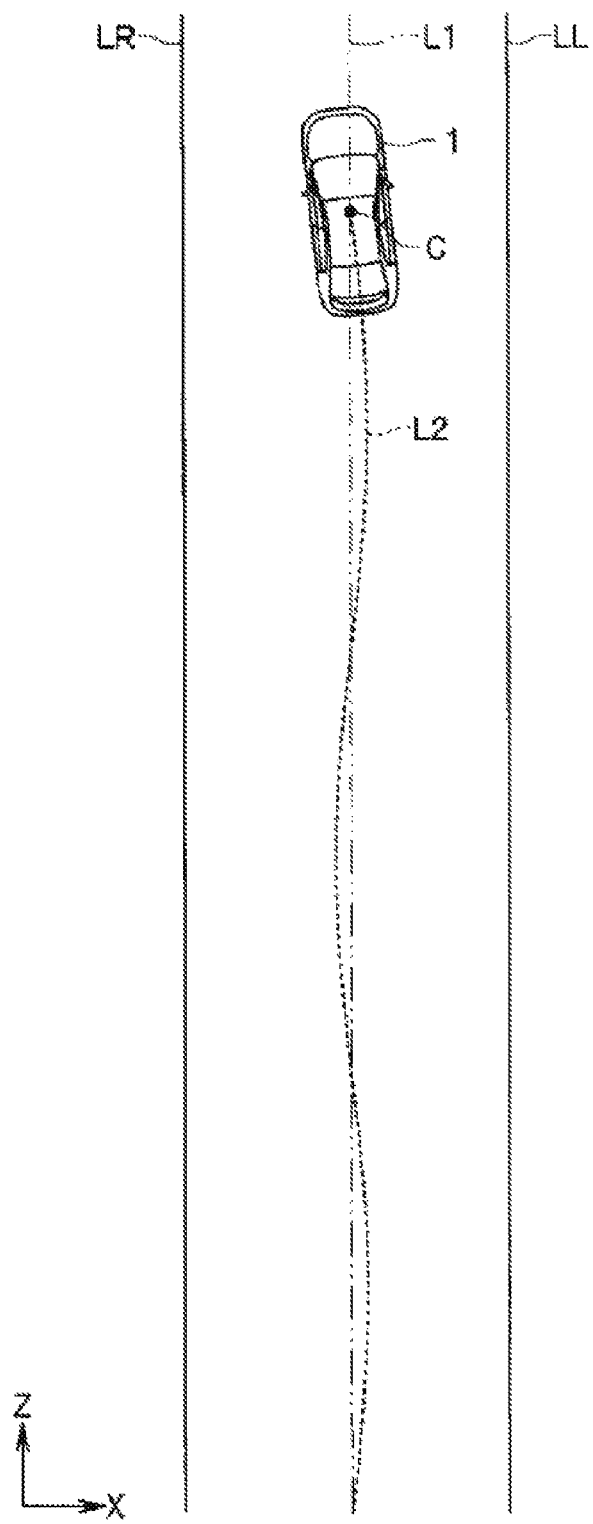
FIG. 4 illustrates periodic sway of a vehicle in the first embodiment of the disclosure.

In this embodiment, the automatic steering control apparatus 100 is configured to execute not only the automatic steering control such as the lane keeping control, but also a correction control. The correction control includes correcting the steering angle on the occasion of execution of the lane keeping control. Here, the correction control is described in outline, with reference to FIG. 4. FIG. 4 illustrates periodic sway of the vehicle 1. In FIG. 4, the vehicle widthwise direction of the vehicle 1 is assumed to be an X-axis, and a vehicle lengthwise direction of the vehicle 1 an Z axis. In FIG. 4, solid lines denoted by reference characters LL and LR are lane lines that define right and left sides of a traveling lane. A long dashed double-short dashed line denoted by reference characters L1 is an ideal travel locus to be obtained from the target position (hereinafter referred to as an ideal locus). A broken line denoted by reference characters L2 is a locus of a position C of the center of gravity of the vehicle 1. The ideal locus L1 is a virtual curve that couples a plurality of the target positions to be calculated at predetermined time intervals or at predetermined positional intervals.

FIG. 4 illustrates an example where the lane keeping control is being carried out along a straight road. In the case with the execution of the lane keeping control, the position of the vehicle 1, e.g., the position C of the center of gravity, ideally matches the target position. In particular, in the example illustrated in FIG. 4, the steering angle of the vehicle 1 ideally becomes zero (0). In reality, however, the position of the vehicle 1 deviates slightly from the target position in an X-axis direction because of influences of, for example, external disturbances. Accordingly, a control of correcting the position of the vehicle 1 by changing the steering angle is repeatedly executed. As a result, the vehicle 1 travels while crossing repetitively the ideal locus L1, and a locus L2 of the position C of the center of gravity of the vehicle 1 repetitively crosses the ideal locus L1. Thus, the lane keeping control may possibly involve the periodic sway of the vehicle 1 around the target position.

As illustrated in FIG. 4, in a case with the locus L2 of the position C of the center of gravity of the vehicle 1 having a waveform like a sine wave, a steering angle waveform also has a waveform like a sine wave. The steering angle waveform is a waveform representing a time change in the steering angle. The inventors of the technology have found that a regular steering waveform like a sine wave gives the sense of discomfort to an occupant. This sense of discomfort is not limited to the case with the execution of the lane keeping control along a straight road, but also occurs in a case with the execution of the lane keeping control along a curve.

The correction control in this embodiment is a control of correcting the steering angle on the occasion of the execution of the lane keeping control in order to alleviate the sense of discomfort as described above. The correction control may include controlling the steering angle, to allow at least a portion of the steering angle waveform in the case where the vehicle 1 travels while crossing repetitively the ideal locus L1 to have a non-sinusoidal wave. In one example, the correction control may be executed in a state in which the lane keeping control is stably executed.

As is described later, an amplitude of the steering angle waveform in the case with execution of the correction control becomes smaller than the amplitude of the steering angle waveform in a case without the execution of the correction control. Accordingly, in particular, in a state where the lane keeping control is not stably executed, there is possibility that the vehicle 1 comes close to one side of the traveling lane, or possibility that the vehicle 1 deviates from the traveling lane. Thus, from the viewpoint of enhanced safety, in the state where the lane keeping control is not stably executed, the usual lane keeping control may be executed as it is.

Moreover, the steering angle during the execution of the lane keeping control is controlled by the target torque. Accordingly, during the execution of the lane keeping control, in the case where the vehicle 1 travels while crossing repetitively the ideal locus L1, a target torque waveform also has a waveform like a sine wave. The target torque waveform is a waveform representing a time change in the target torque. The correction control may include correcting the target torque, to allow at least a portion of the target torque waveform in the case where the vehicle 1 travels while crossing repetitively the ideal locus L1 to have a non-sinusoidal wave. This allows at least a portion of the steering angle waveform to have a non-sinusoidal wave.

Here, a description is given of a sine wave and a non-sinusoidal wave in this embodiment. In this embodiment, a sine wave refers to a waveform that exhibits a periodic change, with no or little superimposition of harmonics. Each of an amplitude and a period of the sine wave may be constant or varied. Further, in this embodiment, a non-sinusoidal wave refers to a waveform other than the sine wave as mentioned above. Non-limiting examples of the non-sinusoidal wave may include a trapezoidal wave, a rectangular wave, a triangular wave, a waveform in which a sine wave is deformed by superimposition of a plurality of harmonics on the sine wave, and a waveform in which a portion of a sine wave is linearized to have a trapezoidal waveform.

In particular, in this embodiment, for example, the non-sinusoidal wave may be the waveform in which a portion of the sine wave is linearized to have the trapezoidal waveform. The waveform in which a portion of the sine wave is linearized to have the trapezoidal waveform means a waveform that corresponds to a half (½) cycle of the sine wave and includes a crest or a trough that is linearized for predetermined time. The crest is an upper peak of the sine wave, and the trough is a lower peak of the sine wave. In one example, each of the linearized portions may have a constant size. The correction control may include controlling the steering angle, to allow the steering angle waveform to include a plurality of non-sinusoidal portions. In each of the non-sinusoidal portions, the crest, the trough, or both are linearized for the predetermined time. The plurality of the non-sinusoidal portions each corresponds to a waveform of one cycle of the steering angle waveform. Hereinafter, the predetermined time is referred to as correction control time. The correction control time is time shorter than a half (½) cycle of the steering angle waveform in the case without the execution of the correction control.

Figure 5:
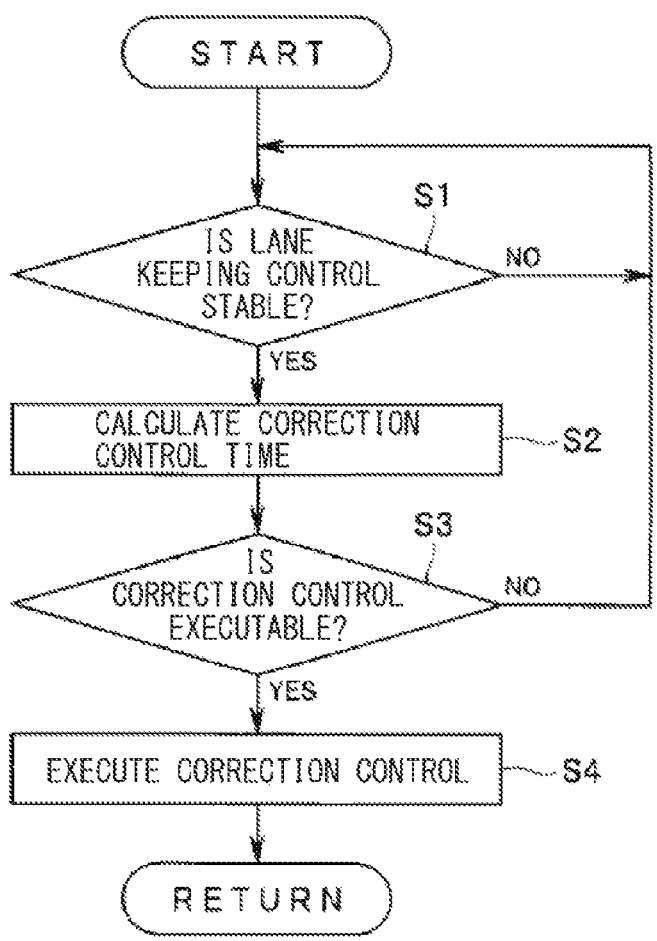
FIG. 5 is a flowchart of a correction control in the first embodiment of the disclosure.

Description is given next, referring to FIGS. 3 and 5, of the operation of the automatic steering control apparatus 100 on the occasion of the execution of the correction control. In this embodiment, in order to execute the correction control, the steering angle controller, that is, the automatic steering control unit 11, may include a deviation determination unit 34, a correction control time calculator 35, and a correction control execution determination unit 36, in addition to the target position calculator 31, the estimated position calculator 32, and the target torque calculator 33.

FIG. 5 is a flowchart of the correction control. In the correction control, first, a determination may be made as to whether or not the lane keeping control is stable (step S1). This determination may be made, for example, using the lateral positional deviation, i.e., the deviation in the vehicle widthwise direction of the vehicle 1 from the target position to the estimated position. In other words, in step S1, the deviation determination unit 34 may acquire a plurality of sets of the target position and the estimated position from the target position calculator 31 and the estimated position calculator 32, and calculate a plurality of the lateral positional deviations. Moreover, the deviation determination unit 34 may determine whether or not an absolute value of each of the plurality of the lateral positional deviations is equal to or smaller than a predetermined threshold.

The number of the sets of the target position and the estimated position the deviation determination unit 34 acquires, and the threshold to be used in the determination as mentioned above may be set to numerical values that allow the lane keeping control to be considered stable. The threshold may be, for example, in a range of several centimeters to several tens of centimeters (in one example, 20 cm). That is, the lane keeping control may be considered stable, in a case where the position of the vehicle 1, e.g., the position C of the center of gravity, falls within the predetermined range, for a period of time long enough to acquire the plurality of the sets of the target position and the estimated position. The predetermined range includes the ideal locus L1 as a centerline and is defined by the threshold as mentioned above.

In step S1, in a case with a determination that the lane keeping control is not stable, that is, in a case where the deviation determination unit 34 determines that the absolute value of each of the plurality of the lateral positional deviations is not equal to or smaller than the predetermined threshold (NO in step S1), the process of step S1 may be executed again.

In step S1, in a case with a determination that the lane keeping control is stable, that is, in a case where the deviation determination unit 34 determines that the absolute value of each of the plurality of the lateral positional deviations is equal to or smaller than the predetermined threshold (YES in step S1), the correction control time calculator 35 may calculate the correction control time (step S2). For example, the correction control time calculator 35 may acquire the vehicle speed from the vehicle speed sensor 14 and acquire the lane curvature from the lane recognition unit 24, to change the correction control time in accordance with the acquired vehicle speed and the lane curvature. In one example, the correction control time calculator 35 may calculate the correction control time, to shorten the correction control time as the vehicle speed increases, and to shorten the correction control time as the lane curvature increases. For example, in a case with the vehicle speed of 80 km on a straight road, the correction control time may be, for example, within a range of 3 seconds to 5 seconds both inclusive (in one example, 3 seconds). In a case with the vehicle speed of 120 km on a straight road, the correction control time may be a period of time within a predetermined range and shorter than the correction control time in the case with the vehicle speed of 80 km on a straight road (in one example, 2 seconds).

Thereafter, the correction control execution determination unit 36 may determine whether or not the correction control is executable (step S3). For example, first, the correction control execution determination unit 36 may acquire the vehicle lateral position and the relative-to-lane yaw angle from the lane recognition unit 24, acquire the steering angle from the steering angle sensor 13, acquire the vehicle speed from the vehicle speed sensor 14, and acquire the correction control time from the correction control time calculator 35, to calculate the position, the relative-to-lane yaw angle, or both of the vehicle 1, with the steering angle fixed to a predetermined angle until the correction control time elapses. The predetermined angle is, for example, an angle whose absolute value becomes smaller than the amplitude of the steering angle waveform in the case without the execution of the correction control.

Thereafter, the correction control execution determination unit 36 may determine whether or not the calculated position and the relative-to-lane yaw angle of the vehicle 1 satisfy an execution condition of the correction control. In one example, the correction control execution determination unit 36 may determine that the execution condition of the correction control is satisfied, in the case where the absolute value of the lateral positional deviation to the position of the vehicle 1 calculated from the target position is equal to or smaller than the predetermined threshold. Moreover, the correction control execution determination unit 36 may determine that the execution condition of the correction control is satisfied, in a case where the calculated relative-to-lane yaw angle is equal to or smaller than a predetermined threshold.

In step S3, in the case with the determination that the execution condition of the correction control is satisfied (YES in step S3), the correction control may be executed (step S4). In one example, the correction control execution determination unit 36 may transmit, to the target torque calculator 33, the command signal that instructs the execution of the correction control, and the correction control time. Upon receiving the command signal, the target torque calculator 33 may execute the correction control. For example, the target torque calculator 33 may correct the target torque for the predetermined time, to allow at least a portion of the target torque waveform in the case where the vehicle 1 travels while crossing repetitively the ideal locus L1 to have a non-sinusoidal wave. The predetermined time may be a period of time corresponding to one cycle of the target torque waveform before correction, or alternatively, the predetermined time may be a period of time corresponding to a plurality of cycles.

Furthermore, the target torque calculator 33 may change the correction control time randomly. In one example, let us assume that T is the correction control time calculated by the correction control time calculator 35 and that G is a gain.

The target torque calculator 33 may change the gain G randomly within a range of 0 to 1 both inclusive, and set a product of the correction control time T by the gain G (T×G) as the correction control time to be used in the correction control.

After the execution of the correction control, or in step S3, in a case with a determination that the execution condition of the correction control is not satisfied (NO in step S3), the flow may return to step S1.

Figure 6:
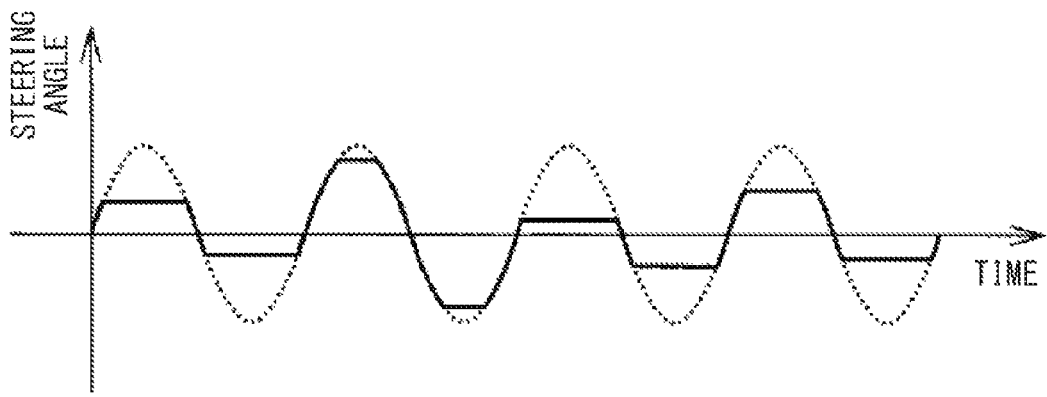
FIG. 6 is a waveform diagram of a first example of a steering angle waveform in the first embodiment of the disclosure.
Figure 7:
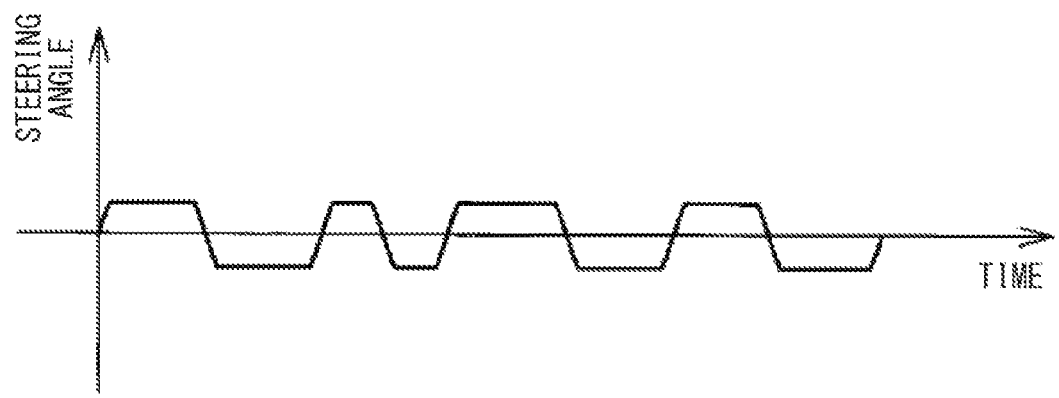
FIG. 7 is a waveform diagram of a second example of the steering angle waveform in the first embodiment of the disclosure.

Description is given next, with reference to FIGS. 6 and 7, of first and second examples of the steering angle waveform. It is to be noted that in the first and second examples, the target torque calculator 33 changes the correction control time randomly.

FIG. 6 is a waveform diagram illustrating the first example of the steering angle waveform. In FIG. 6, the steering angle waveform in the case without the execution of the correction control (hereinafter referred to as the pre-correction steering angle waveform) is indicated by a dashed line, and the steering angle waveform in the case with the execution of the correction control (hereinafter referred to as the post-correction steering angle waveform) is indicated by a solid line. In the first example, first, the steering angle increases to a predetermined first angle that does not reach the crest of the pre-correction steering angle waveform. Thereafter, a state in which the steering angle is the first angle continues for the predetermined time (correction control time). Thereafter, the steering angle decreases to a predetermined second angle that does not reach the trough of the pre-correction steering angle waveform. Thereafter, a state in which the steering angle is the second angle continues for the predetermined time (correction control time). In the first example, the change in the steering angle as described above is repeated.

In the first example, in particular, magnitude of each of the first and second angles are changed in accordance with a duration of the correction control time, to superpose, on the pre-correction steering angle waveform, the portion within the post-correction steering angle waveform in which the steering angle increases or decreases.

FIG. 7 is a waveform diagram illustrating the second example of the steering angle waveform. In the second example, a mode of the change in the steering angle is the same as the first example, except that the magnitude of each of the first and second angles is constant.

In both the first example and the second example, the amplitude of the post-correction steering angle waveform becomes smaller than that of the pre-correction steering angle waveform. Moreover, in both the first example and the second example, the steering angle waveform includes the plurality of the non-sinusoidal portions. In each of the non-sinusoidal portions, both the crest and the trough are linearized for the predetermined time. The plurality of the non-sinusoidal portions each corresponds to one cycle of the steering angle waveform.

Figure 8:
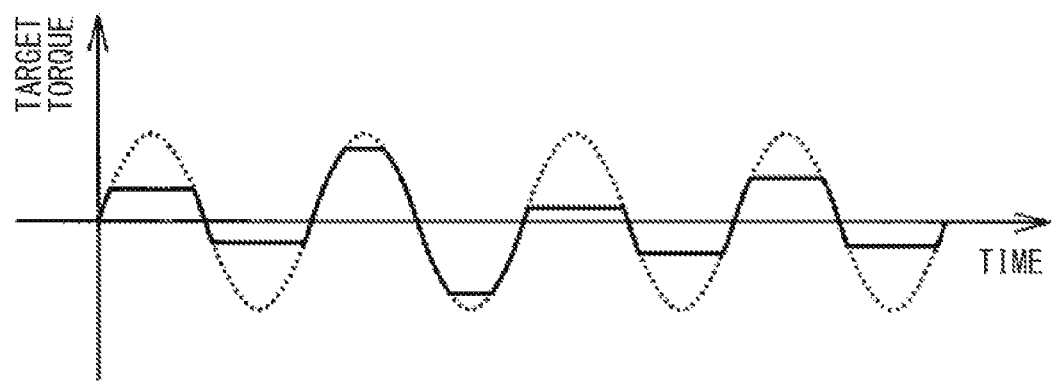
FIG. 8 is a waveform diagram of an example of a target torque waveform in the first embodiment of the disclosure.

Description is given next, with reference to FIG. 8, of an example of the target torque waveform. It is to be noted that in this example, the target torque calculator 33 changes the correction control time randomly. In FIG. 8, the target torque waveform in the case without the execution of the correction control (hereinafter referred to as the pre-correction target torque waveform) is indicated by a dashed line, and the target torque waveform in the case with the execution of the correction control (hereinafter referred to as the post-correction target torque waveform) is indicated by a solid line. In the example illustrated in FIG. 8, a mode of the change in the post-correction target torque waveform is the same as the first example of the post-correction steering angle waveform illustrated in FIG. 6. That is, in the example illustrated in FIG. 8, first, the target torque increases to predetermined first torque that does not reach the crest of the pre-correction target torque waveform. Thereafter, a state in which the target torque is the first torque continues for the predetermined time (correction control time). Thereafter, the target torque decreases to predetermined second torque that does not reach the trough of the pre-correction target torque waveform. Thereafter, a state in which the target torque is the second torque continues for the predetermined time (correction control time). In the example illustrated in FIG. 8, the change in the target torque as mentioned above is repeated.

In the example illustrated in FIG. 8, in particular, the magnitude of each of the first torque and the second torque may be changed in accordance with the duration of the correction control time, to superpose, on the pre-correction target torque waveform, the portion within the post-correction target torque waveform in which the torque increases or decreases.

The mode of the change in the post-correction target torque waveform is not limited to the example illustrated in FIG. 8. For example, the mode of the change in the post-correction target torque waveform may be the same as the second example of the steering angle waveform illustrated in FIG. 7.

As described, in this embodiment, the steering angle control device 101 controls the steering angle, to allow at least a portion of the steering angle waveform in the case where the vehicle 1 travels while crossing repetitively the ideal locus L1 to have the non-sinusoidal wave. Hence, according to this embodiment, it is possible to prevent the steering angle waveform from changing regularly like a sine wave, leading to alleviation of the sense of discomfort caused by the periodic sway of the vehicle 1 on the occasion of the execution of the automatic steering control.

Moreover, in this embodiment, the target torque calculator 33 may change the correction control time randomly. Hence, it is possible to prevent the steering angle waveform from changing regularly, leading to further alleviation of the sense of discomfort.

Second Embodiment

Figure 9:
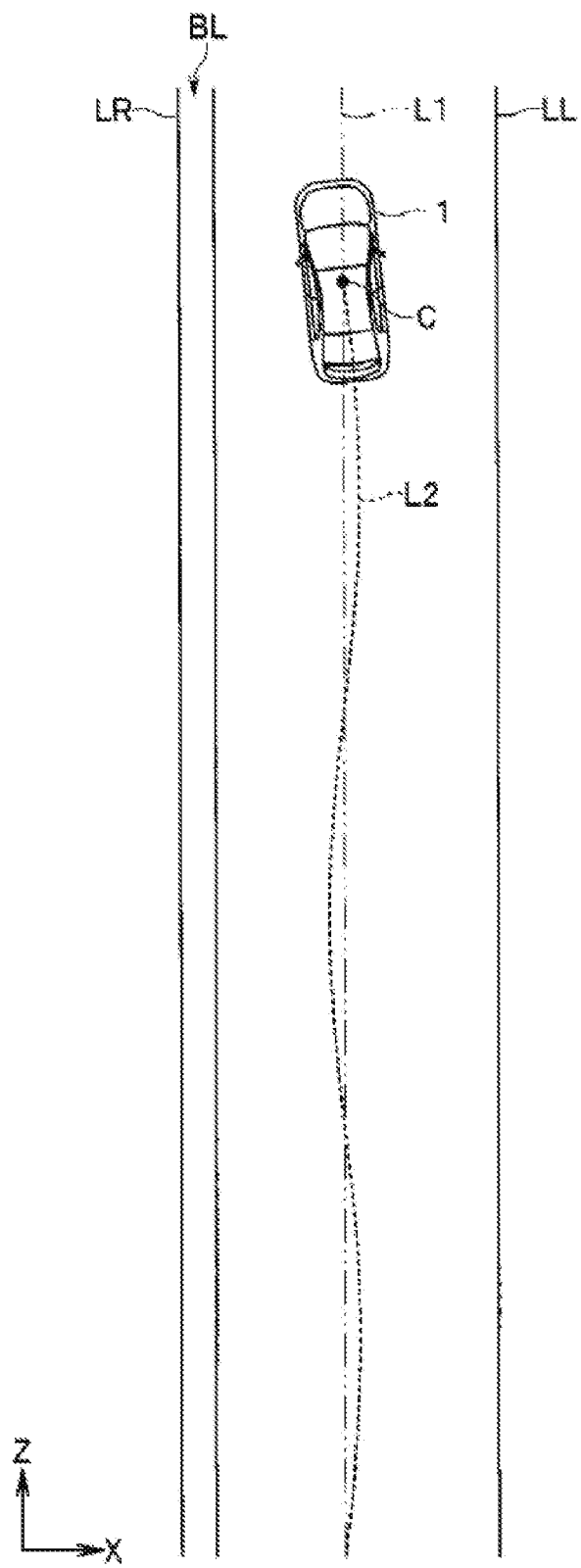
FIG. 9 illustrates periodic sway of a vehicle in a second embodiment of the disclosure.

Description now moves on to a second embodiment of the disclosure. First, an outline of the correction control is described with reference to FIG. 9. FIG. 9 illustrates the periodic sway of the vehicle 1. In FIG. 9, the lane lines that define the left and right sides of the traveling lane, the ideal locus, and the locus of the position C of the center of gravity of the vehicle 1 are denoted by the same reference characters as those in FIG. 4 in the first embodiment.

FIG. 9 illustrates an example where the lane keeping control is being carried out along a straight road provided with a bicycle dedicated lane on side on which the lane line LR is disposed. Hereinafter, the bicycle dedicated lane is referred to as a bicycle lane and is denoted by reference characters BL. As illustrated in FIG. 9, the periodic sway of the vehicle 1 around the target position while the lane keeping control is being executed along a straight road provided with the bicycle lane BL results in alternate repetition of a state in which the vehicle 1 comes slightly close to the bicycle lane BL (state in which the vehicle 1 is close to the bicycle lane BL with respect to the ideal locus L1), and a state in which the vehicle 1 is slightly distant from the bicycle lane BL (state in which the vehicle 1 is distant from the bicycle lane BL with respect to the ideal locus L1).

As described in the first embodiment, the amplitude of the steering angle waveform in the case with the execution of the correction control is smaller than the amplitude of the steering angle waveform in the case without the execution of the correction control. Accordingly, correcting the steering angle by the correction control at timing when the vehicle 1 comes slightly close to the bicycle lane BL may possibly cause rather long-time continuation of the state in which the vehicle 1 remains slightly close to the bicycle lane BL. A lane provided with the bicycle lane BL involves potential uncertainties such as a bicycle popping out from the bicycle lane BL toward the vehicle 1. Thus, the continuation of the state in which the vehicle 1 remains slightly close to the bicycle lane BL may give the sense of discomfort or uneasiness to an occupant. Such sense of discomfort or uneasiness may also occur on a road with the potential uncertainties such as a bicycle or a pedestrian popping out toward the vehicle 1, e.g., a road that includes no oncoming lanes or sidewalks but includes a roadside strip for passage of pedestrians.

The steering angle control device 101 in this embodiment may control the steering angle on the occasion of the execution of the correction control, to shorten a period of time when the vehicle 1 remains slightly close to whichever of the right and left sides of the traveling lane has the potential uncertainties. Such a control may be provided by allowing the steering angle control device 101 to change the correction control time corresponding to the crest or the trough of each of the non-sinusoidal portions of the steering angle waveform, in accordance with information regarding the potential uncertainties of both sides of the lane on which the vehicle 1 is traveling.

In this embodiment, in particular, the lane recognition unit 24 of the camera unit 21 (see FIG. 2) is configured to generate, as a piece of the road information, the information regarding the potential uncertainties of both sides of the lane on which the vehicle 1 is traveling. In one example, the lane recognition unit 24 may recognize, from the image of the travel environment forward in the traveling direction of the vehicle 1, presence or absence of a bicycle lane, presence or absence of an oncoming lane, presence or absence of a sidewalk, and presence or absence of a roadside strip. Thus, the lane recognition unit 24 may generate the information regarding the potential uncertainties. The information regarding the potential uncertainties is information indicating whichever of the right and left sides of the lane has the potential uncertainties.

The target torque calculator 33 (see FIG. 3) is configured to acquire the information regarding the potential uncertainties from the lane recognition unit 24. On the occasion of the execution of the correction control, the target torque calculator 33 may change, on the basis of the information regarding the potential uncertainties, the correction control time corresponding to the crest or the trough of each of the non-sinusoidal portions of the target torque waveform.

In one example, the correction control time at timing when the vehicle 1 comes slightly close to whichever of the right and left sides of the traveling lane has the potential uncertainties may be made shorter than usual or zero (0), to shorten the period of time when the vehicle 1 remains slightly close to whichever side has the potential uncertainties. As illustrated in FIG. 9, in the case with the execution of the lane keeping control along a straight road provided with the bicycle lane BL, the correction control time at the timing when the vehicle 1 comes slightly close to the bicycle lane BL may be made shorter than usual or zero (0). It is to be noted that the correction control time at timing when the vehicle 1 is slightly distant from the bicycle lane BL may be the same as the normal period of time. Allowing the target torque calculator 33 to change the correction control time as described above causes a change in the correction control time corresponding to the crest or the trough of each of the non-sinusoidal portions of the steering angle waveform.

Figure 10:
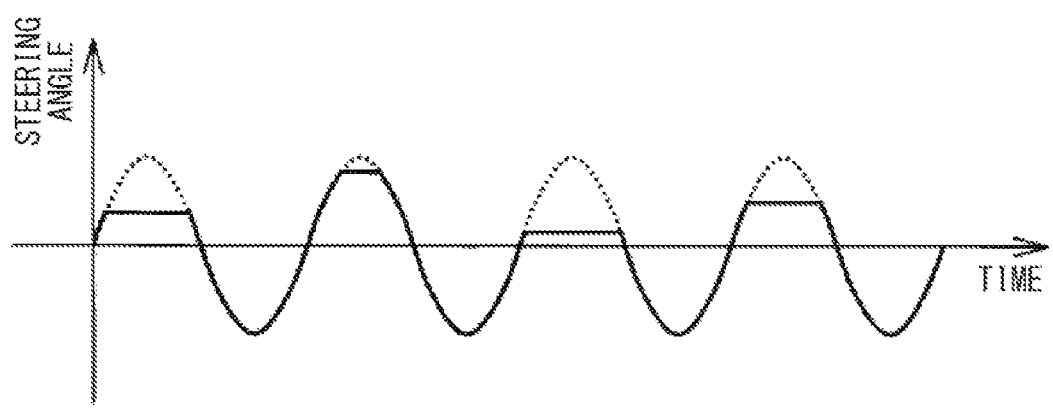
FIG. 10 is a waveform diagram of an example of a steering angle waveform in the second embodiment of the disclosure.

FIG. 10 is a waveform diagram of an example of the steering angle waveform. In FIG. 10, the pre-correction steering angle waveform is indicated by a dashed line, and the post-correction steering angle waveform is indicated by a solid line. In the example illustrated in FIG. 10, the correction control time at the timing when the vehicle 1 comes slightly close to whichever side has the potential uncertainties may be brought to zero (0). In the example illustrated in FIG. 10, the timing when the steering angle comes to or near the trough of each of the non-sinusoidal portions of the steering angle waveform is the timing when the vehicle 1 comes slightly close to whichever side has the potential uncertainties. The timing when the steering angle comes to or near the crest of each of the non-sinusoidal portions of the steering angle waveform is the timing when the vehicle 1 is slightly distant from whichever side has the potential uncertainties. In the example illustrated in FIG. 10, the steering angle waveform may include the plurality of the non-sinusoidal portions. In each of the non-sinusoidal portions, solely the crest may be linearized for the predetermined time. The plurality of the non-sinusoidal portions may each correspond to one cycle of the steering angle waveform.

Although not illustrated, a mode of the change in the post-correction target torque waveform in this embodiment may be the same as the post-correction steering angle waveform.

As described, in this embodiment, the steering angle control device 101 may change the correction control time corresponding to the crest or the trough of each of the non-sinusoidal portions of the steering angle waveform, in accordance with the information regarding the potential uncertainties. Hence, in this embodiment, it is possible to alleviate the sense of discomfort or uneasiness given to an occupant. Moreover, it is possible to shorten the period of time when the vehicle 1 remains slightly close to whichever side has the potential uncertainties, leading to enhanced safety.

Other configurations, workings and effects of this embodiments are similar to those of the first embodiment.

Although some embodiments of the technology are described above by way of example with reference to the accompanying drawings, the technology is by no means limited to the embodiments described above. It should be appreciated that modifications and alterations may be made by persons skilled in the art without departing from the scope as defined by the appended claims. For example, the automatic steering control apparatus in the forgoing embodiments of the disclosure may control the steering angle without through the steering shaft 5.

Moreover, in the correction control in the forgoing embodiments of the disclosure, out of steps S1 to S4 illustrated in FIG. 5, step S3 may be omitted in which the correction control execution determination unit 36 determines whether or not the correction control is executable. In this case, the correction control execution determination unit 36 may be eliminated.

Furthermore, the automatic steering control apparatus in the forgoing embodiments of the disclosure may change the predetermined time randomly.

In addition, the information regarding the travel state in the forgoing embodiments of the disclosure may include the vehicle speed of the vehicle. In this case, the automatic steering control apparatus may change the predetermined time in accordance with the vehicle speed.

Moreover, the road information in the forgoing embodiments of the disclosure may include information regarding the curvature of the lane on which the vehicle is traveling. In this case, the automatic steering control apparatus may change the predetermined time in accordance with the curvature.

The automatic steering control apparatus 100 and the automatic steering control unit 11 illustrated in FIGS. 1 and 3 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the automatic steering control apparatus 100 and the automatic steering control unit 11. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the automatic steering control apparatus 100 and the automatic steering control unit 11 illustrated in FIGS. 1 and 3.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. An automatic steering control apparatus that makes an automatic steering control including allowing a vehicle to travel along a target course, the automatic steering control apparatus comprising:
   a rotation drive unit configured to rotate a steering shaft of the vehicle to steer the vehicle; and
   circuitry configured to:
   acquire a lateral positional deviation from the target course in a vehicle widthwise direction of the vehicle;
   acquire a steering angle of the vehicle;
   calculate a first target steering angle to decrease an absolute value of the lateral positional deviation based on the acquired lateral positional deviation and the acquired steering angle;
   in response to calculating the first target steering angle, cause the rotation drive unit to rotate the steering shaft so that the steering angle changes toward the calculated first target steering angle;
   determine whether a state has continued for a first predetermined period in which i) the acquired steering angle oscillates around a reference value so that the vehicle travels while crossing repetitively the target course and ii) the acquired lateral positional deviation is smaller than or equal to a predetermined threshold value;
   in response to determining that the state has continued for the first predetermined period, estimate, under an assumption that the steering angle of the vehicle is held at a predetermined angle, the lateral positional deviation from the target course in the vehicle widthwise direction of the vehicle after a second predetermined period, the predetermined angle being an angle that deviates from the reference value of the steering angle by a predetermined value, the predetermined value being smaller than a maximum amount of a deviation of the acquired steering angle from the reference value in the state;
   determine whether the estimated lateral positional deviation after the second predetermined period is smaller than or equal to the predetermined threshold value;
   in response to determining that the estimated lateral positional deviation after the second predetermined period is smaller than or equal to the predetermined threshold value, calculates a second target steering angle by correcting the calculated first target steering angle so that an absolute value of a deviation from the reference value is smaller than or equal to the predetermined value until the second period elapses; and
   in response to calculating the second target steering angle, cause the rotation drive unit to rotate the steering shaft so that the steering angle changes toward the calculated second target steering angle.

2. The automatic steering control apparatus according to claim 1, wherein the circuitry is configured to calculate the second predetermined period so that the second predetermined period becomes shorter as a vehicle speed of the vehicle increases.

3. The automatic steering control apparatus according to claim 1, wherein the circuitry is configured to calculate the second predetermined period so that the second predetermined period becomes shorter as a curvature of the target course increases.

* * * * *